(12) United States Patent
Dar et al.

(10) Patent No.: US 12,375,885 B2
(45) Date of Patent: Jul. 29, 2025

(54) RICH COMMUNICATION SERVICES IN MULTI-CARRIER ENVIRONMENTS

(71) Applicant: T-Mobile USA, Inc., Bellevue, WA (US)

(72) Inventors: Sheraz Farooq Dar, Bellevue, WA (US); Zakir Hussain Syed, Bellevue, WA (US); Sudhanshu Pandey, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 734 days.

(21) Appl. No.: 17/733,990

(22) Filed: Apr. 29, 2022

(65) Prior Publication Data

US 2023/0353985 A1 Nov. 2, 2023

(51) Int. Cl.
*H04W 4/06* (2009.01)
*H04W 8/00* (2009.01)
*H04W 88/16* (2009.01)

(52) U.S. Cl.
CPC ............ *H04W 4/06* (2013.01); *H04W 8/005* (2013.01); *H04W 88/16* (2013.01)

(58) Field of Classification Search
CPC ........ H04W 4/06; H04W 8/005; H04W 88/16
USPC ..................................................... 455/414.1
See application file for complete search history.

(56) References Cited

U.S. PATENT DOCUMENTS

| | | |
|---|---|---|
| 6,499,053 B1 | 12/2002 | Marquette et al. |
| 6,564,261 B1 | 5/2003 | Gudjonsson et al. |
| 6,788,949 B1 | 9/2004 | Bansal |
| 7,072,941 B2 | 7/2006 | Griffin et al. |
| 7,111,044 B2 | 9/2006 | Lee |
| 7,159,008 B1 | 1/2007 | Wies et al. |
| 7,522,911 B2 | 4/2009 | Ung et al. |
| 7,558,220 B2 | 7/2009 | Chambers et al. |
| 7,640,293 B2 | 12/2009 | Wilson et al. |
| 7,743,096 B2 | 6/2010 | Bouilloux-lafont et al. |

(Continued)

FOREIGN PATENT DOCUMENTS

KR 101884514 B1 8/2018

OTHER PUBLICATIONS

RCS Interworking Guidelines Version 18.0 IR.90 Oct. 2020 (Year: 2020).*

*Primary Examiner* — William Nealon
(74) *Attorney, Agent, or Firm* — Perkins Coie LLP

(57) ABSTRACT

An open group chat (OGC) session is initiated between mobile devices registered to different telecommunications networks by first verifying whether each implicated network has a network-to-network interface (NNI) agreement with each other network. A first mobile device receives a request to initiate an OGC session between the first mobile device, a second mobile device registered to a second telecommunications network, and a third mobile device registered to a third telecommunications network. The first device determines, based on a response received from the second network, if an operator of the second network and an operator of the third network have an NNI agreement. If the received response indicates the operators of the second and third networks do not have an NNI agreement, the first mobile device sends a non-OGC message, such as a multimedia messaging service (MMS) message or a closed group chat (CGC) message, to the second and third devices.

20 Claims, 6 Drawing Sheets

(56) References Cited

U.S. PATENT DOCUMENTS

| | | |
|---|---|---|
| 7,899,478 B2 | 3/2011 | Fodor |
| 8,107,921 B2 | 1/2012 | Fiatal |
| 8,169,462 B2 | 5/2012 | Ryu |
| 8,213,969 B2 | 7/2012 | Paik et al. |
| 8,346,862 B2 | 1/2013 | Kraft et al. |
| 9,582,682 B2 | 2/2017 | Song et al. |
| 9,705,996 B2 | 7/2017 | Oh |
| 9,723,512 B2 | 8/2017 | Den Hartog |
| 9,906,945 B2 | 2/2018 | Midkiff |
| 9,923,940 B2 | 3/2018 | Jerrard-dunne et al. |
| 2001/0042095 A1 | 11/2001 | Kim et al. |
| 2003/0041092 A1 | 2/2003 | Woo |
| 2005/0037809 A1 | 2/2005 | Guan |
| 2006/0171380 A1 | 8/2006 | Chia |
| 2007/0162553 A1 | 7/2007 | Dewing et al. |
| 2011/0055735 A1 | 3/2011 | Wood et al. |
| 2012/0099504 A1 | 4/2012 | Hyun et al. |
| 2012/0178536 A1 | 7/2012 | Oh et al. |
| 2012/0221664 A1 | 8/2012 | Jing |
| 2019/0222550 A1* | 7/2019 | Yau .................. H04L 51/04 |
| 2022/0141260 A1* | 5/2022 | Yao ................. H04L 51/043 |
| | | 709/206 |

\* cited by examiner

RICH COMMUNICATION SERVICES IN MULTI-CARRIER ENVIRONMENTS

BACKGROUND

Rich Communication Services (RCS) is a communication protocol that enables enhanced messaging capabilities between mobile devices. Among these capabilities is open group chat. To enable an open group chat between two mobile devices registered to different network operators, the network operators must have a network-to-network interface (NNI) agreement in place to facilitate the transfer of open group chat data from one mobile network to another. If the group chat includes mobile devices registered to multiple different networks where only a subset of the networks have NNI agreements, not all mobile devices participating in the chat will be able to resume the chat after it times out. Since the users participating in the chat may not have insight into the reason the chat cannot be resumed, the unexplained failure of the chat can reduce user experience with the service.

BRIEF DESCRIPTION OF THE DRAWINGS

Detailed descriptions of implementations of the present invention will be described and explained through the use of the accompanying drawings.

Figure 1A:
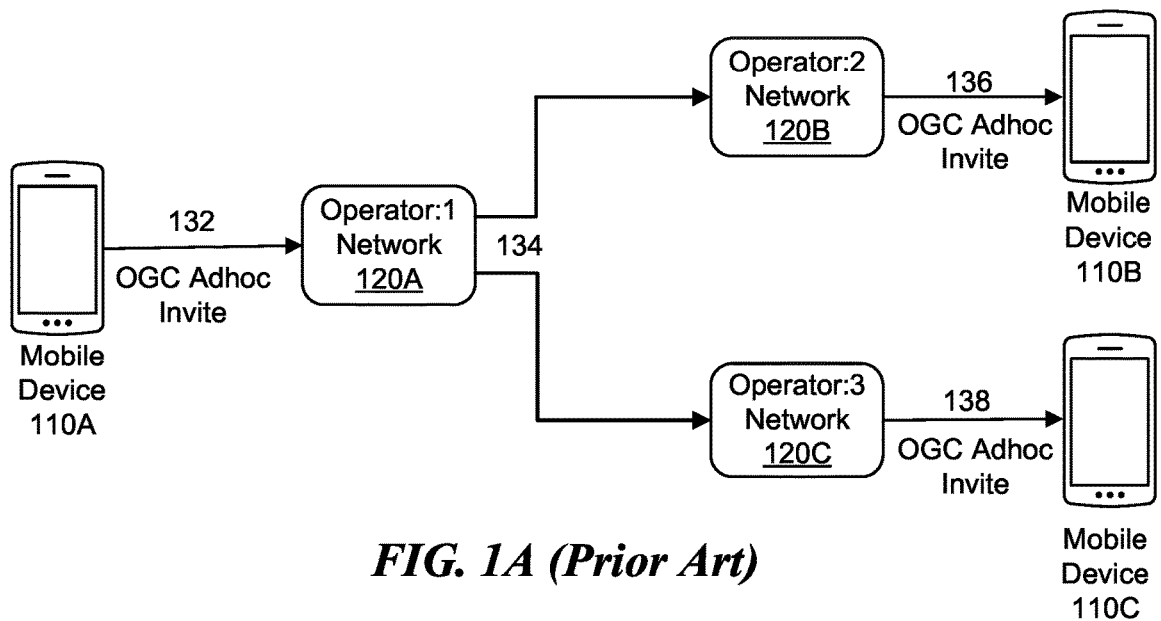
FIGS. 1A-1B illustrate an example process for initiating open group chat sessions between mobile devices registered to different operator networks.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

To improve the reliability of open group chat when mobile devices registered to different telecommunications networks participate in the service, the inventors have conceived of and reduced to practice an improved protocol for operating such open group chats. Before an open group chat is initiated between mobile devices registered to different mobile networks, a first mobile device requests presence information of a second mobile device that is intended to participate in the chat. The presence information identifies whether the mobile network to which the second mobile device is registered includes a network-to-network interface (NNI) agreement with any other mobile networks that are implicated by the group chat. If any of the mobile networks do not have an NNI agreement with any of the other implicated mobile networks, the first mobile device initiates a chat session using a technology or protocol other than open group chat, such as multimedia messaging services (MMS) or closed group chat.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Figure 1B:
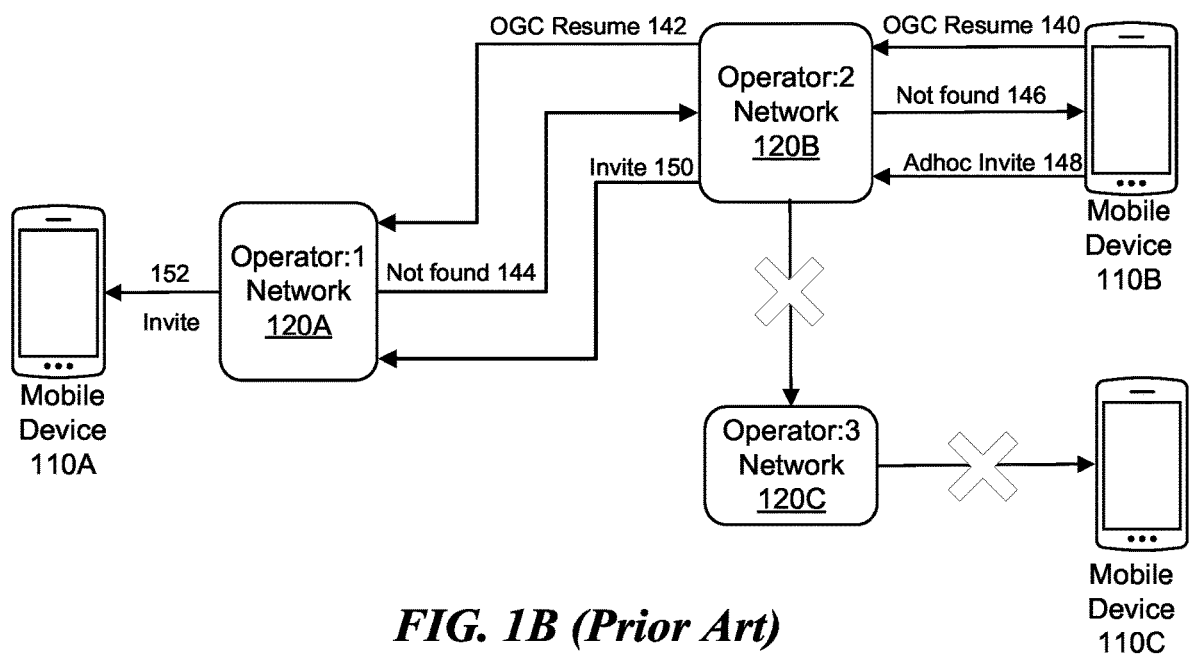

FIGS. 1A-1B illustrate an existing process for initiating open group chat sessions between mobile devices registered to different operator networks. As shown in FIG. 1A, a first mobile device, mobile device 110A, transmits an open group chat (OGC) adhoc invite via its mobile operator network 120A at step 132. The adhoc invite is directed towards a second mobile device 110B, which is registered to a second operator network 120B, and a third mobile device 110C, which is registered to a third operator network 120C.

To initiate an open group chat with the devices registered to other networks, the first operator network 120A needs to have a network-to-network interface (NNI) agreement in place with the other operator networks. The NNI agreement is a contractual agreement between operators that interconnects the networks of the operators and that defines signaling and management of traffic across an interface between the operators' networks.

If the first operator network 120A has agreements in place with the second and third networks 120B and 120C, the first operator network 120A passes the adhoc invite to the second and third operator networks 120B and 120C at step 134. Each operator network respectively passes the invite to the mobile devices 110B and 110C at steps 136 and 138, enabling the users of the mobile devices 110 to chat.

If the group chat remains idle for a period of time, the metadata for the chat stored at the first operator network will expire. FIG. 1B illustrates an attempted resumption of the group chat after the chat metadata has expired. In the example of FIG. 1B, the user of the second mobile device 110B attempts to resume the chat, causing the second mobile device 110B to transmit an OGC resume command to the second operator network 120B at step 140. The second operator network 120B passes the OGC resume command to the first operator network 120A at step 142. However, since metadata associated with the original chat session has expired, the first operator network 120A returns a notification that the chat session cannot be found at step 144, which is passed to the second mobile device 110B at step 146.

In response, the second mobile device 110B creates a new adhoc invite at step 148. When the invite message is received, the second operator network 120B determines whether an NNI agreement is in place with the first and third operator networks in order to start a new chat session with the first and third mobile devices. Since the second operator network has an NNI agreement with the first operator network (as discussed above), the invite is passed to the first operator network 120A at step 150, then to the first mobile device 110A at step 152.

However, if the second operator network 120B does not have an NNI agreement in place with the third operator network 120C, the adhoc invite cannot be passed to the third mobile device 110C. The user of the third mobile device 110C therefore cannot join the resumed group chat session as initiated by the second mobile device 110B.

Open group chat includes functionality beyond that enabled by messaging protocols such as simple messaging service (SMS) or multimedia messaging service (MMS), including features such as allowing users to leave the group; allowing users to add or remove other users from the group; or enabling a subject, icon, or host of the group to be changed. However, if users try to take advantage of the functionality enabled by open group chat when fewer than all of the implicated operators have NNI agreements with each other, they may miss messages when the chat is unable to resume as described above.

Figure 2:
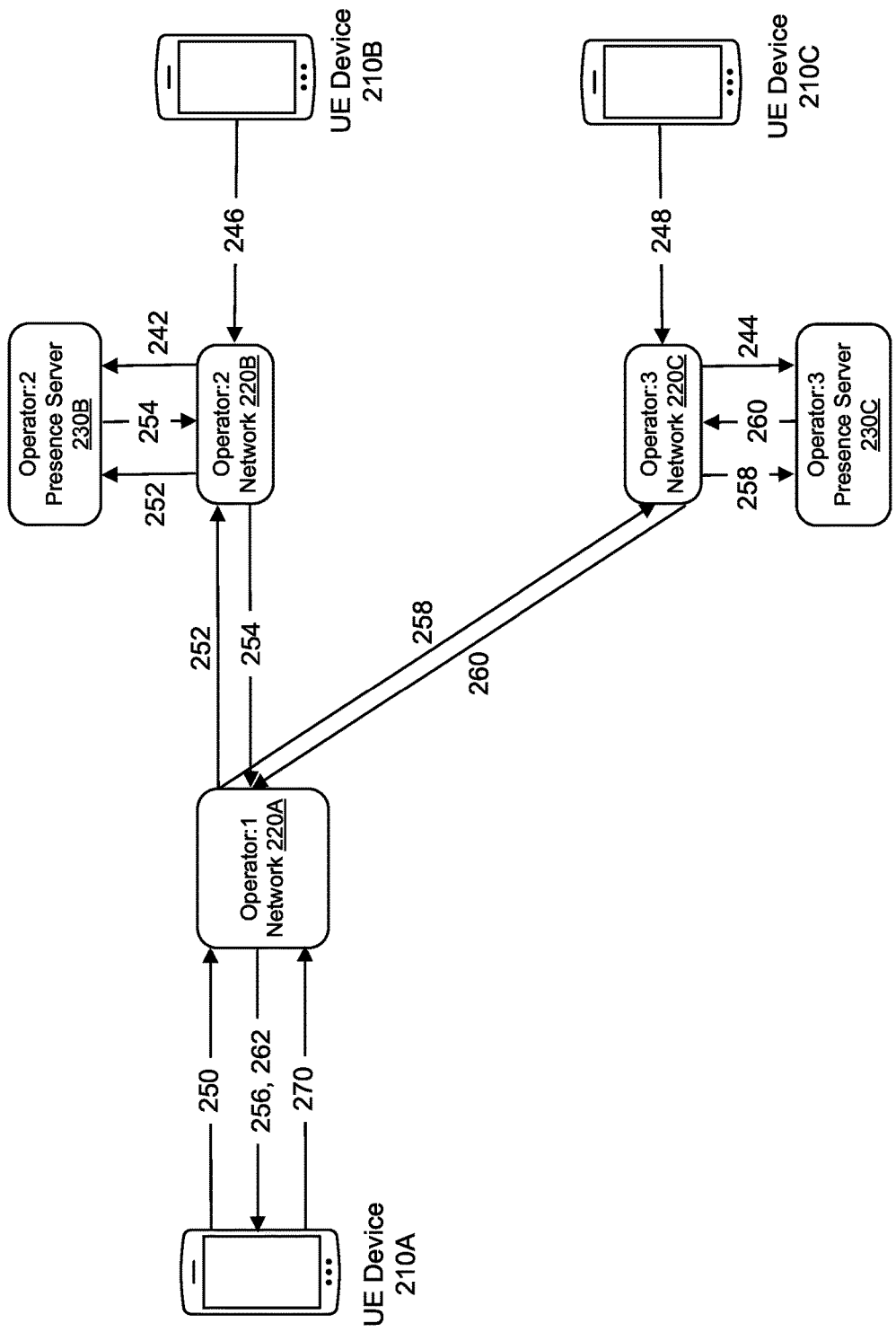
FIG. 2 illustrates an environment in which open group chat is operated, according to some implementations.

FIG. 2 illustrates an environment in which open group chat is operated according to implementations herein. By way of example, the environment includes a first user equipment (UE) device 210A registered to a first mobile network, a second UE device 210B registered to a second mobile network, and a third UE device 210C registered to a third mobile network. A group chat can include more than one UE device on each mobile network, or can include devices registered to additional mobile networks beyond the first, second, and third mobile networks.

Each mobile network can include systems or components to facilitate operation of the network and communications between the first, second, and third UE devices. As shown in FIG. 2, the Operator:1 Network block 220A represents a set of network components and network functions that together create the infrastructure, control operations, and signaling to operate the first mobile network. For example, the Operator:1 Network block 220A can represent network access nodes, control plane network functions, and back office systems to manage the first mobile network. Similarly, the Operator:2 Network block 220B represents components and functions that together implement aspects of the second mobile network, and the Operator:3 Network block 220C represents components and functions that together implement aspects of the third mobile network.

Each mobile network can further include one or more presence servers 230. The presence server for a respective mobile network stores presence states for UE devices registered to the network that indicate the availability of a corresponding UE device for communication. The availability of a device for communication can include features such as the capabilities of the device with respect to various types of communication. For example, with respect to group chat communications, the presence state maintained by each presence server can indicate whether the device is capable of communicating by open group chat and, if so, whether file transfer over HTTP (FT-HTTP) can occur in the group chat. Additionally, according to implementations of the presence servers herein, the respective mobile network operators can publish information about NNI agreements between networks to the presence servers. Thus, the presence server for a mobile network can maintain a record indicating whether the mobile network has an NNI agreement in place with each of one or more other mobile networks. The presence server for each mobile network can be implemented, for example, as a physical server, a virtual server, a combination of physical servers and proxies, or as a set of functions performed by other components within the respective mobile network.

As shown in FIG. 2, the second operator network 220B publishes an indication of any NNI agreements with other operator networks to its corresponding presence server 230B at step 242. Similarly, if the third operator network 220C has any NNI agreements with other operator networks, an indication of each agreement is published to the corresponding presence server 230C at step 244. The indications published to the presence servers can include, for example, copies of the NNI agreements themselves or a data record identifying the network(s) for which an NNI agreement exists.

In some implementations, instead of or in addition to publishing indications of the NNI agreements to the individual presence servers, the respective network operators can publish the indications to other locations. For example, some or all of the network operators can publish indications of NNI agreements to a centralized server (e.g., a centralized presence server). In another example, a record of the NNI agreements can each be recorded to a distributed ledger or a blockchain.

The second UE device 210B publishes its presence state to the presence server 230B corresponding to the Operator:2 Network 220B at step 246. Similarly, the third UE device 210C publishes its presence state to the presence server 230C corresponding to the Operator:3 Network 220C at step 248.

When the user of the first UE device 210A initiates a group chat with the second and third UE devices, the first UE device 210A requests presence information of the second and third UE devices via the first operator network 220A at step 250. The first operator network 220A sends a presence subscription request to the second network's presence server 230B via the second operator network 220B at step 252. In response to the request, the presence server 230B returns a notify response at step 254. The notify response includes a tuple that indicates any networks with which the second network 220B has an NNI agreement. For example, the presence server 230B queries the stored indications of NNI agreements and generates a tuple to list identifiers of any operator networks for which the second network has NNI agreements. In addition to returning the tuple indicating NNI agreements, the presence server 230B can return one or more other tuples in the notify response, such as a tuple that indicates whether the second UE device 210B has open group chat capabilities or a tuple that indicates whether the second UE device 2106 has FT-HTTP capabilities. The notify response, including any tuples output by the presence server 230B, is returned to the first UE device 210A at step 256.

Similarly, the first operator network 220A sends a presence subscription request to the third network's presence server 230C via the third operator network 220C at step 258. In response to the request, at step 260, the presence server 230C returns a notify response that includes one or more tuples, including at least a tuple that indicates one or more networks with which the third network has NNI agreements. The notify response is returned to the first UE device 210A at step 262.

The first UE device 210A uses the responses received from the presence servers 230B and 230C to determine whether to initiate an open group chat. In general, if an NNI agreement is in place between all mobile networks implicated in the chat, the first UE device 210 determines that an open group chat can be initiated and transmits, at step 270, an OGC invite to the second and third UE devices 210B, 210C. If at least one mobile network does not have an NNI agreement in place with another mobile network, the first UE device 210 disables open group chat and instead transmits an MMS or CGC message (which is handled through the MMS server for the corresponding networks To determine if the networks have NNI agreements in place, the first UE device 210 processes the tuples received from the presence servers to determine if the tuples indicate the existence of NNI agreements between each of the participating mobile networks.

By initiating an open group chat only if an NNI agreement is in place between all relevant network operators, the first UE device 210A improves open group chats by ensuring that an open group chat session is not opened unless the session can be resumed by any participating device. Accordingly, the process shown in FIG. 2 solves the problem illustrated in FIGS. 1A-1B.

The steps of the process shown in FIG. 2 can be performed by different devices or combinations of devices. For example, the group chat can include fewer or more than three mobile devices 210, and the chat can be initiated by a device other than the first mobile device 210A. Furthermore, in some implementations, a similar process for initiating an open group chat is performed even if fewer than three mobile networks are involved in the chat session.

Example User Equipment Device

Figure 3:
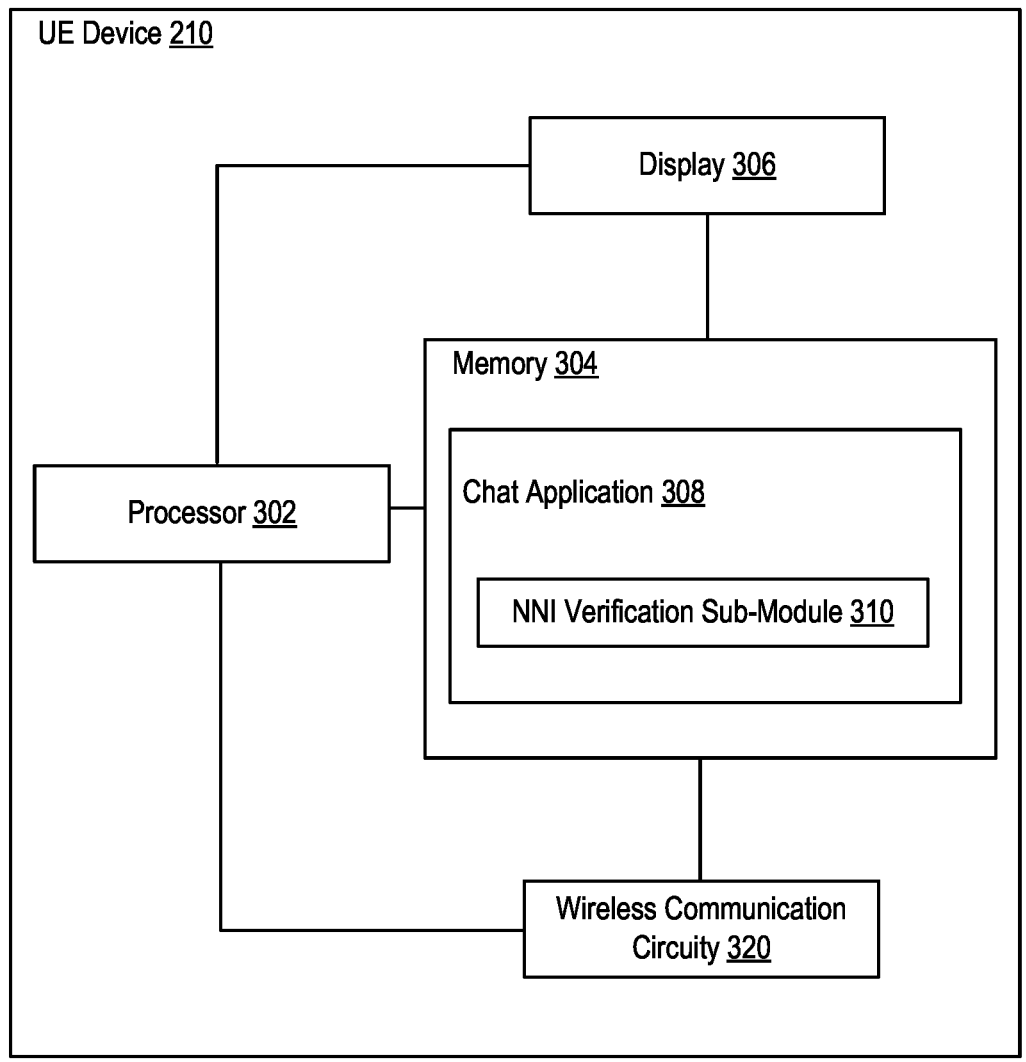
FIG. 3 is a block diagram that illustrates components of a user equipment device, according to some implementations.

FIG. 3 is a block diagram that illustrates components of a user equipment device 210, according to an example implementation. The components shown in FIG. 3 are merely illustrative and well-known components are omitted for brevity. As shown, the UE device 210 includes a processor 302, a memory 304, and a display 306. The UE device 210 may also include wireless communication circuitry 320 designed to establish wireless communication channels with other computing devices. The processor 302 can have generic characteristics similar to general-purpose processors, or the processor 302 may be an application-specific integrated circuit (ASIC) that provides arithmetic and control functions to the UE device 210. While not shown, the processor 302 may include a dedicated cache memory. The processor 302 can be coupled to all components of the UE device 210, either directly or indirectly, for data communication.

The memory 304 may be comprised of any suitable type of storage device including, for example, a static random-access memory (SRAM), dynamic random-access memory (DRAM), electrically erasable programmable read-only memory (EEPROM), flash memory, latches, and/or registers. In addition to storing instructions which can be executed by the processor 302, the memory 304 can also store data generated by the processor 302 (e.g., when executing the modules of an optimization platform). The memory 304 is merely an abstract representation of a storage environment. Hence, in some embodiments, the memory 304 is comprised of one or more actual memory chips or modules.

An example of the display 306 includes a touch-enabled display or a non-touch-enabled display, in which case the UE device 210 likely also includes (or is connected to) an input device such as a keyboard. An example of the wireless communication circuitry 320 forms and/or communicate with a network for data transmission among computing devices, such as personal computers, mobile phones, and computer servers. The wireless communication circuitry 320 can be used for communicating with these computing devices or for connecting to a higher-level network (e.g., a LAN) or the Internet. Examples of wireless communication circuitry 120 include Bluetooth, Z-Wave, ZigBee, and the like. In some embodiments, the connection established by the wireless communication circuitry 320 can be bootstrapped by a near field communication (NFC) connection.

A chat application 308 executed by the UE device 210 enables a user of the device to communicate with other UE devices via text, video, multimedia file exchange, or other types of content. The chat application 308 is a computer program that resides within the memory 304. During a chat session, the chat application 308 can receive inputs from the user of the device 210 via an input device (such as a touchscreen display or keyboard), send and receive chat messages via the wireless communication circuitry 320, and display content received from other chat participants on the display 306. The chat application 308 can be configured to enable chats according to a variety of protocols, such as enabling both open group chat and a type of chat that does not employ rich communication services, such as MMS.

The chat application 308 includes an NNI verification submodule 310. The term "module" refers broadly to software components, firmware components, and/or hardware components. Accordingly, the NNI verification submodule 310 could be comprised of software, firmware, and/or hardware components implemented in, or accessible to, the UE device 210.

When a group chat is initiated by a user of the UE device 210, the NNI verification submodule 310 causes the UE device 210 to request presence information of other UE devices specified for participation in the chat. The NNI verification submodule 310 can also process responses received to the requests for presence information. For example, the NNI verification submodule 310 parses one or more tuples received from a presence server to determine if the telecommunications network to which the UE device 210 is registered has an NNI agreement in place with another telecommunications network involved in the chat, to determine if two telecommunications networks in the chat (other than the network to which the UE device 210 is registered) have NNI agreements with each other, to determine capabilities of each of the devices involved in the chat, and so forth. Based on the processed responses, the NNI verification submodule 310 can cause the chat application 308 to initiate different types of chat sessions according to the capabilities of the participating devices and/or the presence or absence of NNI agreements between implicated telecommunications networks.

Wireless Communications System

Figure 4:
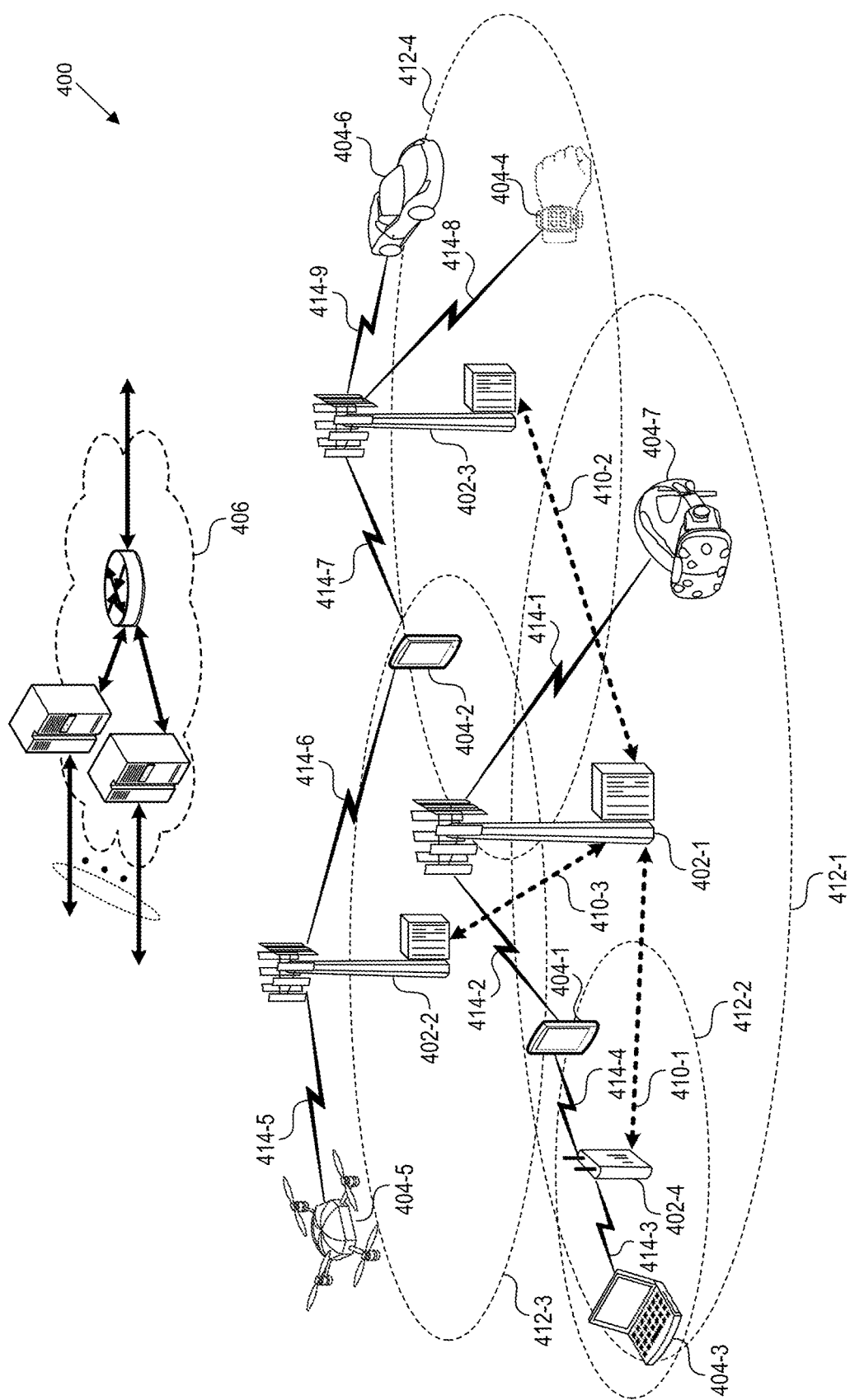
FIG. 4 is a block diagram that illustrates a wireless communications system that can implement aspects of the present technology.

FIG. 4 is a block diagram that illustrates a wireless telecommunication network 400 ("network 400") in which aspects of the disclosed technology are incorporated. The network 400 includes base stations 402-1 through 402-4 (also referred to individually as "base station 402" or collectively as "base stations 402"). A base station is a type of network access node (NAN) that can also be referred to as a cell site, a base transceiver station, or a radio base station. The network 400 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 400 formed by the network 400 also include wireless devices 404-1 through 404-7 (referred to individually as "wireless device 404" or collectively as "wireless devices 404") and a core network 406. The wireless devices 404-1 through 404-7 can correspond to or include network 400 entities capable of communication using various connectivity standards. For example, a 5G communication channel can use millimeter wave (mmW) access frequencies of 28 GHz or more. In some implementations, the wireless device 404 can operatively couple to a base station 402 over a long-term evolution/long-term evolution-advanced (LTE/LTE-A) communication channel, which is referred to as a 4G communication channel.

The core network 406 provides, manages, and controls security services, user authentication, access authorization, tracking, Internet Protocol (IP) connectivity, and other access, routing, or mobility functions. The base stations 402 interface with the core network 406 through a first set of backhaul links (e.g., S1 interfaces) and can perform radio configuration and scheduling for communication with the wireless devices 404 or can operate under the control of a base station controller (not shown). In some examples, the base stations 402 can communicate with each other, either directly or indirectly (e.g., through the core network 406), over a second set of backhaul links 410-1 through 410-3 (e.g., X1 interfaces), which can be wired or wireless communication links.

The base stations 402 can wirelessly communicate with the wireless devices 404 via one or more base station antennas. The cell sites can provide communication coverage for geographic coverage areas 412-1 through 412-4 (also referred to individually as "coverage area 412" or collectively as "coverage areas 412"). The geographic coverage area 412 for a base station 402 can be divided into sectors making up only a portion of the coverage area (not shown). The network 400 can include base stations of different types (e.g., macro and/or small cell base stations). In some implementations, there can be overlapping geographic coverage areas 412 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 400 can include a 5G network 400 and/or an LTE/LTE-A or other network. In an LTE/LTE-A network, the term eNB is used to describe the base stations 402, and in 5G new radio (NR) networks, the term gNBs is used to describe the base stations 402 that can include mmW communications. The network 400 can thus form a heterogeneous network 400 in which different types of base stations provide coverage for various geographic regions. For example, each base station 402 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 400 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 400 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 400 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 404 and the base stations 402 or core network 406 supporting radio bearers for the user plane data. At the Physical (PHY) layer, the transport channels are mapped to physical channels.

Wireless devices can be integrated with or embedded in other devices. As illustrated, the wireless devices 404 are distributed throughout the wireless telecommunications network 400, where each wireless device 404 can be stationary or mobile. For example, wireless devices can include handheld mobile devices 404-1 and 404-2 (e.g., smartphones, portable hotspots, tablets, etc.); laptops 404-3; wearables 404-4; drones 404-5; vehicles with wireless connectivity 404-6; head-mounted displays with wireless augmented reality/virtual reality (ARNR) connectivity 404-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 404-1, 404-2, 404-3, 404-4, 404-5, 404-6, and 404-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 400 equipment at the edge of a network 400 including macro eNBs/gNBs, small cell eNBs/gNBs, relay base stations, and the like. A wireless device can also communicate with other wireless devices either within or outside the same coverage area of a base station via device-to-device (D2D) communications.

The communication links 414-1 through 414-9 (also referred to individually as "communication link 414" or collectively as "communication links 414") shown in network 400 include uplink (UL) transmissions from a wireless device 404 to a base station 402, and/or downlink (DL) transmissions from a base station 402 to a wireless device 404. The downlink transmissions can also be called forward link transmissions while the uplink transmissions can also be called reverse link transmissions. Each communication link 414 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 414 can transmit bidirectional communications using frequency division duplex (FDD) (e.g., using paired spectrum resources) or Time division duplex (TDD) operation (e.g., using unpaired spectrum resources). In some implementations, the communication links 414 include LTE and/or mmW communication links.

In some implementations of the network 400, the base stations 402 and/or the wireless devices 404 include multiple antennas for employing antenna diversity schemes to improve communication quality and reliability between base stations 402 and wireless devices 404. Additionally or alternatively, the base stations 402 and/or the wireless devices 404 can employ multiple-input, multiple-output (MIMO) techniques that can take advantage of multi-path environments to transmit multiple spatial layers carrying the same or different coded data.

5G Core Network Functions

Figure 5:
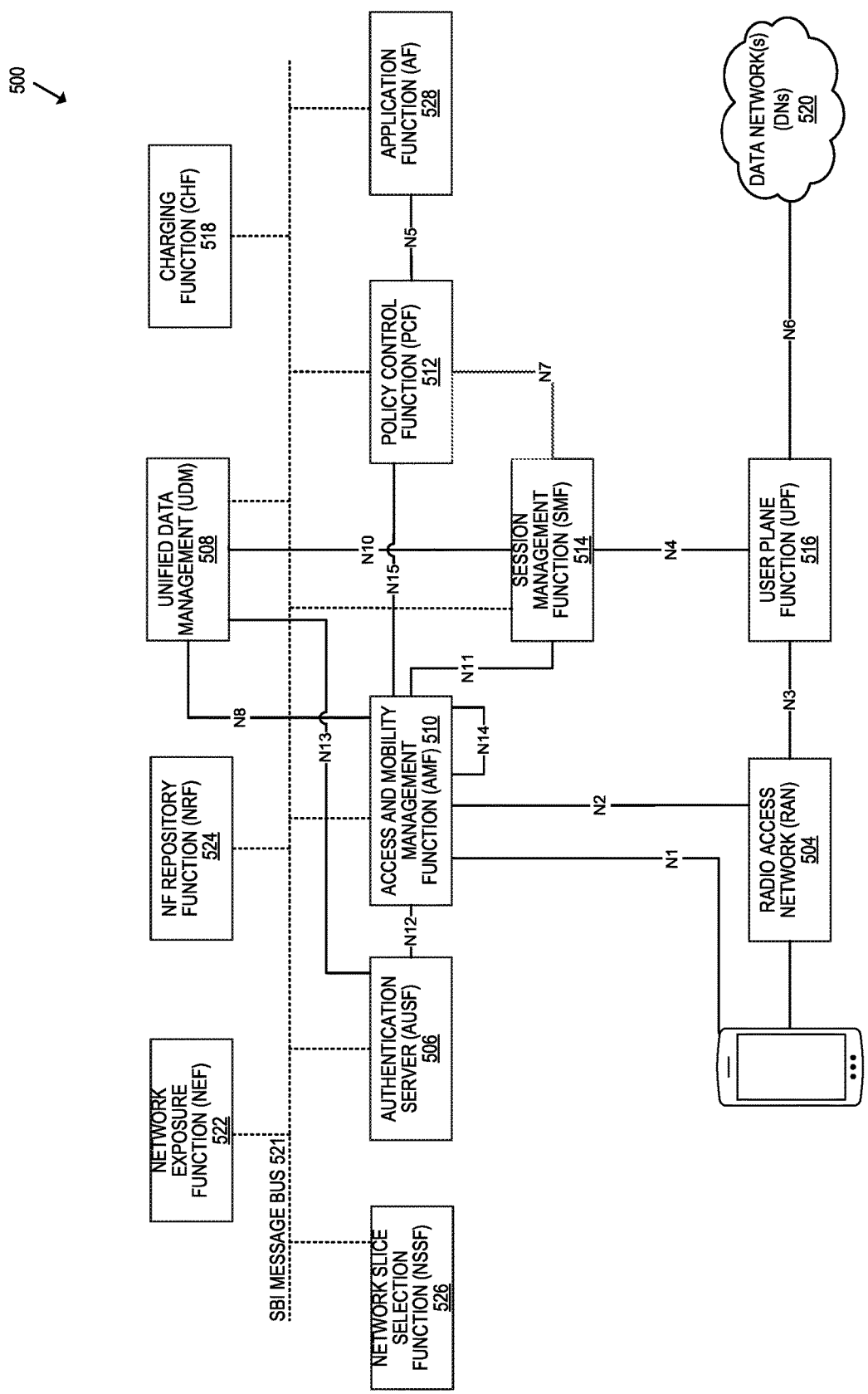
FIG. 5 is a block diagram that illustrates 5G core network functions (NFs) that can implement aspects of the present technology.

FIG. 5 is a block diagram that illustrates an architecture 500 including 5G core network functions (NFs) that can implement aspects of the present technology. A wireless device 502 can access the 5G network through a NAN (e.g., gNB) of a RAN 504. The NFs include an Authentication Server Function (AUSF) 506, a Unified Data Management (UDM) 508, an Access and Mobility management Function (AMF) 510, a Policy Control Function (PCF) 512, a Session Management Function (SMF) 514, a User Plane Function (UPF) 516, and a Charging Function (CHF) 518.

The interfaces N1 through N15 define communications and/or protocols between each NF as described in relevant standards. The UPF 516 is part of the user plane and the AMF 510, SMF 514, PCF 512, AUSF 506, and UDM 508 are part of the control plane. One or more UPFs can connect with one or more data networks (DNs) 520. The UPF 516 can be deployed separately from control plane functions. The NFs of the control plane are modularized such that they can be scaled independently. As shown, each NF service exposes its functionality in a Service Based Architecture (SBA) through a Service Based Interface (SBI) 521 that uses HTTP/2. The SBA can include a Network Exposure Function (NEF) 522, a NF Repository Function (NRF) 524 a Network Slice Selection Function (NSSF) 526, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 524, which maintains a record of available NF instances and supported services. The NRF 524 allows other NF instances to subscribe and be notified of registrations from NF instances of a given type. The NRF 524 supports service discovery by receipt of discovery requests from NF instances and, in response, details which NF instances support specific services.

The NSSF 526 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 502 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 508 and then requests an appropriate network slice of the NSSF 526.

The UDM 508 introduces a User Data Convergence (UDC) that separates a User Data Repository (UDR) for storing and managing subscriber information. As such, the UDM 508 can employ the UDC under 3GPP TS 22.101 to support a layered architecture that separates user data from application logic. The UDM 508 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 508 can contain voluminous amounts of data that is accessed for authentication. Thus, the UDM 508 is analogous to a Home Subscriber Server (HSS), to provide authentication credentials while being employed by the AMF 510 and SMF 514 to retrieve subscriber data and context.

The PCF 512 can connect with one or more application functions (AFs) 528. The PCF 512 supports a unified policy framework within the 5G infrastructure for governing network behavior. The PCF 512 accesses the subscription information required to make policy decisions from the UDM 508, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 524. This allows the SCP to become the delegated discovery point in a datacenter, offloading the NRF 524 from distributed service meshes that make-up a network operator's infrastructure. Together with the NRF 524, the SCP forms the hierarchical 5G service mesh.

The AMF 510 receives requests and handles connection and mobility management while forwarding session management requirements over the N11 interface to the SMF 514. The AMF 510 determines that the SMF 514 is best suited to handle the connection request by querying the NRF 524. That interface and the N11 interface between the AMF 510 and the SMF 514 assigned by the NRF 524, use the SBI 521. During session establishment or modification, the SMF 514 also interacts with the PCF 512 over the N7 interface and the subscriber profile information stored within the UDM 508. Employing the SBI 521, the PCF 512 provides the foundation of the policy framework which, along with the more typical QoS and charging rules, includes Network Slice selection, which is regulated by the NSSF 526.

Computer System

Figure 6:
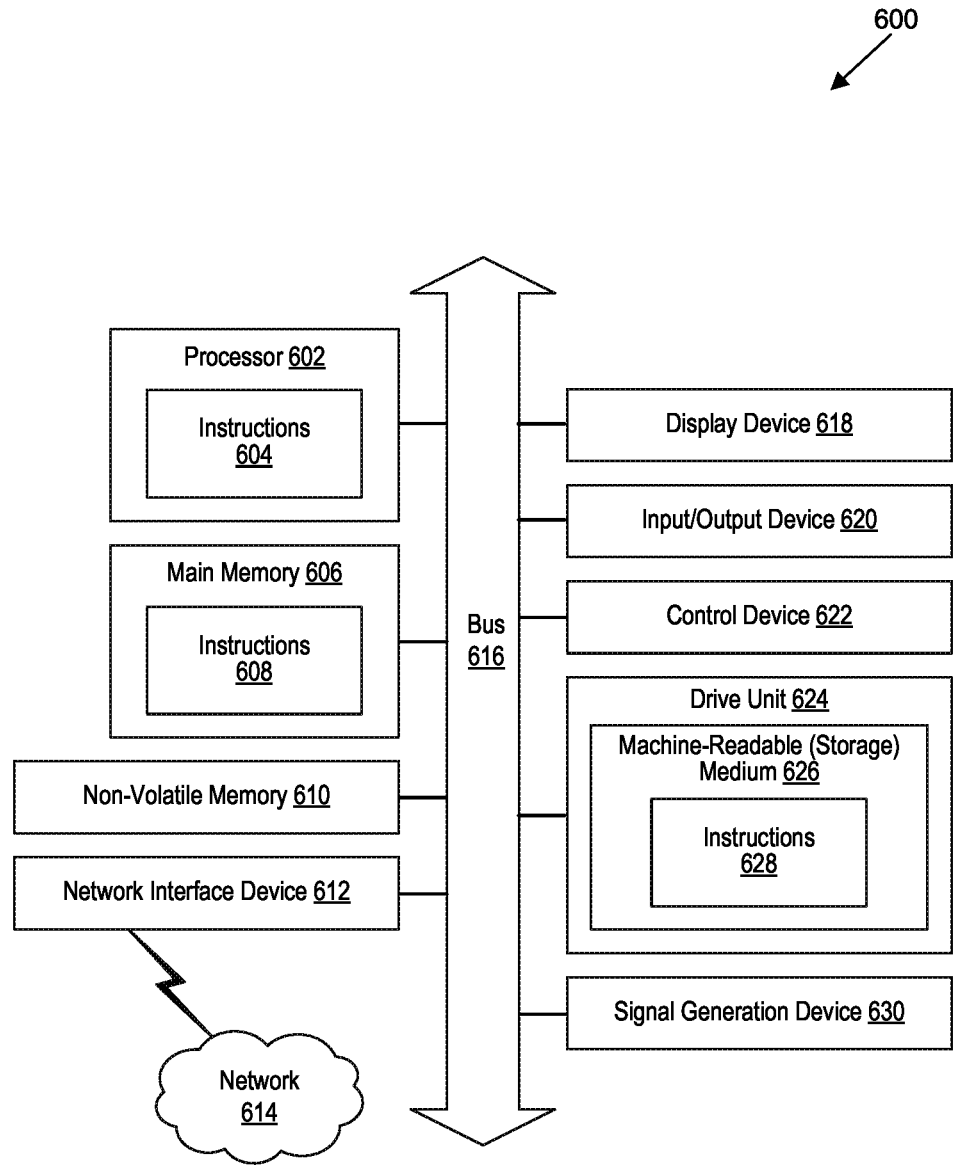
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer-readable storage medium, excluding transitory signals and carrying instructions, which, when executed by at least one data processor of a system, cause the system to:
   receive a request to initiate an open group chat (OGC) session between a first user equipment (UE) device, a second UE device registered on a second telecommunications network, and a third UE device registered on a third telecommunications network;
   determine, based on a response received from the second telecommunications network, if an operator of the second telecommunications network and an operator of the third telecommunications network have a network-to-network interface (NNI) agreement to enable rich communication services communications between the second telecommunications network and the third telecommunications network; and
   when the response received from the second telecommunications network indicates the operator of the second telecommunications network and the operator of the third telecommunications network do have the NNI agreement,
      send, from the first UE device, an open group chat invite to the second UE device and the third UE device;
   when the response received from the second telecommunications network indicates the operator of the second telecommunications network and the operator of the third telecommunications network do not have the NNI agreement,
      send, from the first UE device, a multimedia messaging service (MMS) message or a closed group chat (CGC) message to the second UE device and the third UE device.

2. The computer-readable storage medium of claim 1, wherein determining when the operator of the second telecommunications network and the operator of the third telecommunications network have the NNI agreement comprises:
   transmitting a request for presence information of the second UE device to the second telecommunications network; and
   processing a tuple output by the operator of the second telecommunications network to determine if the tuple contains an identifier of the NNI agreement between the second mobile network and the third mobile network.

3. The computer-readable storage medium of claim 2, wherein the tuple is output by a presence server associated with the second telecommunications network.

4. The computer-readable storage medium of claim 1, wherein the instructions further cause the system to:
   if the response received from the second telecommunications network indicates the operator of the second telecommunications network and the operator of the third telecommunications network have the NNI agreement,
      send, from the first UE device, an open group chat invite to the second UE device and the third UE device.

5. The computer-readable storage medium of claim 1, wherein the response received from the second telecommunications network further includes one or more other tuples each identifying a capability of the second UE device.

6. The computer-readable storage medium of claim 5, wherein the one or more other tuples indicate a presence or absence of an open group chat capability of the second UE device, and wherein the instructions further cause the system to send the MMS message or the CGC message to the second UE device and the third UE device when the one or more other tuples indicate the second UE device does not have the open group chat capability.

7. The computer-readable storage medium of claim 5, wherein the instructions further cause the system to:
   transmit a request for presence information of the third UE device to the third telecommunications network,
      wherein a presence server associated with the third telecommunications network is configured to return a response to the request for presence information of the third UE device, and
      wherein the response received from the third telecommunications network includes one or more tuples indicating a presence or absence of an open group chat capability of the third UE device; and
   send the MMS message or the CGC message to the second UE device and the third UE device when the one or more tuples indicate the third UE device does not have the open group chat capability.

8. The computer-readable storage medium of claim 1, wherein the first UE device is registered to a first telecommunications network that is operated by a different operator than the operator of the second telecommunications network and the operator of the third telecommunications network.

9. The computer-readable storage medium of claim 8, wherein the instructions further cause the mobile device to:
query an operator of the first telecommunications network to determine if the operator of the first telecommunications network has an NNI agreement with the operator of the second telecommunications network and an NNI agreement with the operator of the third telecommunications network; and
send the MMS message or the CGC message to the second UE device and the third UE device if the operator of the first telecommunications network does not have an NNI agreement with either the operator of the second telecommunications network or the operator of the third telecommunications network.

10. The computer-readable storage medium of claim 1, wherein the first UE device is registered to the second telecommunications network or the third telecommunications network.

11. A method for processing open group chat requests at a mobile device registered to a first mobile network operator, the method comprising:
receiving a request to initiate a chat session with a plurality of other mobile devices, wherein at least a second mobile device in the plurality of other mobile devices is registered to a second mobile network operator and a third mobile device in the plurality of other mobile devices is registered to a third mobile network operator;
transmitting, via the first mobile network operator, a presence subscription request to a presence server associated with the second mobile network operator, wherein the presence server associated with the second mobile network operator is configured to return a first notify response to the presence subscription request;
processing the first notify response to determine if the notify response includes an identification of a network-to-network interface (NNI) agreement between the second mobile network operator and the third mobile network operator;
when the first notify response includes the identification of the NNI agreement between the second mobile network operator and the third mobile network operator,
sending an open group chat invite to the plurality of other mobile devices; and
when the first notify response does not include the identification of the NNI agreement between the second mobile network operator and the third mobile network operator,
sending a multimedia messaging service (MMS) message or a closed group chat (CGC) message to the plurality of other mobile devices.

12. The method of claim 11, further comprising:
querying the first mobile network operator to determine if the first mobile network operator has an NNI agreement with the second mobile network operator and an NNI agreement with the third mobile network operator; and
sending the MMS message or the CGC message to the plurality of other mobile devices if the first mobile network operator does not have an NNI agreement with either the second mobile network operator or the third mobile network operator.

13. The method of claim 11, wherein the first notify response includes a tuple listing an identifier of the third mobile network operator when the second mobile network operator has the NNI agreement with the third mobile network operator.

14. The method of claim 11, wherein the first notify response further includes one or more tuples each identifying a capability of the second mobile device.

15. The method of claim 14, wherein the one or more tuples indicate a presence or absence of an open group chat capability of the second mobile device, and wherein the instructions further cause the mobile device to send the MMS message or the CGC message to the plurality of other mobile devices when the one or more tuples indicate the second mobile device does not have the open group chat capability.

16. The method of claim 14, further comprising:
transmitting the presence subscription request to a presence server associated with the third mobile network operator, wherein the presence server associated with the third mobile network operator is configured to return a second notify response to the presence subscription request that includes one or more tuples indicating a presence or absence of an open group chat capability of the third mobile device; and
sending the MMS message or the CGC message to the plurality of other mobile devices when the one or more tuples indicate the third mobile device does not have the open group chat capability.

17. A computer-readable storage medium, excluding transitory signals and carrying instructions, which, when executed by at least one data processor of a system, cause the system to:
store, at a presence server associated with a first telecommunications network operator, a network-to-network interface (NNI) agreement between the first telecommunications network operator and at least one other telecommunications network operator that enables rich communication services between user equipment (UE) devices registered to the first telecommunications network operator and UE devices registered to the at least one other telecommunications network operator;
receive a presence subscription request associated with a request to initiate a chat session between a first UE device registered to the first telecommunications network operator and at least a second UE device registered to the at least one other telecommunications network operator;
generate a notify response to the presence subscription request, wherein the notify response includes information identifying the NNI agreement.

18. The computer-readable storage medium of claim 17, wherein the presence subscription request is received from a third UE device registered to a third telecommunications operator.

19. The computer-readable storage medium of claim 17, wherein generating the notify response further comprises outputting information indicating a capability of the first UE device.

20. The computer-readable storage medium of claim 19, wherein the capability includes at least one of:
an open group chat capability of the first UE device, or
a file transfer over hypertext transfer protocol (FT-HTTP) capability of the first UE device.

* * * * *